3,125,577
N-SUBSTITUTED PIPERAZINOALKYL
GLYCOLATES
John H. Biel, Milwaukee, Wis., assignor to Lakeside Laboratories, Inc., Milwaukee, Wis., a corporation of Delaware
No Drawing. Filed May 3, 1962, Ser. No. 192,054
9 Claims. (Cl. 260—268)

This invention relates to piperazine derivatives. More particularly, this invention is concerned with novel disubstituted glycolates of piperazinoalkanols and the use of such compounds to effect a psychotherapeutic effect.

This application is a continuation-in-part of my copending application Serial No. 14,500 filed March 14, 1960, which is a continuation-in-part of my copending application Serial No. 735,356 filed may 15, 1958, now abandoned.

According to the present invention, there are provided novel compounds of the formula

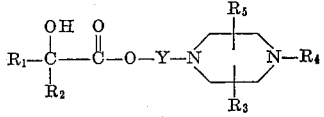

wherein $R_1$ and $R_2$ are any combination of the same or different members of the group consisting of the phenyl, halophenyl groups such as p-chlorophenyl, lower alkoxyphenyl groups such as p-methoxyphenyl, p-hydroxyphenyl, p-aminophenyl, 2-thienyl, furyl, pyridyl, lower alkylphenyl groups such as p-methylphenyl, or cycloalkyl groups having 3 to 7 carbons in the ring including cyclopropyl, cyclopentyl, cyclohexyl and cycloheptyl, $R_3$ and $R_5$ are hydrogen or a lower alkyl such as methyl, ethyl or propyl, $R_4$ represents aralkyl groups such as the phenyl-lower alkyl groups such as phenylmethyl, phenylethyl, phenylisopropyl and phenyl-lower alkyl groups in which the phenyl ring contains one or more nuclear substituents such as halogens and particularly bromine or chlorine, the hydroxy group, lower alkoxy groups and the amino group, a lower alkenyl group such as the allyl group and aralkenyl groups such as the phenyl-lower alkenyl group and particularly the cinnamyl group, and Y is a straight or branched alkylene group of no more than 5 carbons, and acid addition salts and quaternary ammonium salts thereof.

These compounds, advisably in the form of nontoxic acid addition salts, exert a pronounced psychotherapeutic effect when administered to animals, and particularly, humans. The compounds mildly increase motor activity, induce a mild feeling of relaxation and a relief from anxiety or restlessness. 4-phenylisopropyl-beta-piperazinoethyl benzilate is, however, a mild central nervous system stimulant. These compounds are not hypnotics and are essentially devoid of sedative activity. The compounds also have antispasmodic activity as acid addition and quaternary ammonium salts. N-(1-phenyl-2-propyl)-N'-piperazino-gamma-propyl phenylcyclopentylglycolate has about one-half the antispasmodic activity of atropine while gamma-[4-(benzyl) - 3 - methyl-piperazino]propyl benzilate has about one-fiftieth the antispasmodic activity of atropine. The compounds of this invention do not decrease motor activity as do some of the compounds in which $R_4$ is a lower alkyl. The compounds of this invention in which Y is a branched alkylene are more potent as psychotherapeutics and have lower anticholinergic side effects than compounds in which Y is a straight chain alkylene group between the piperazino moiety and the glycolate moiety. Nevertheless, branching of Y often lowers antispasmodic activity, while the antispasmodic activity often increases when Y increases from ethylene to propylene in a straight alpha, omega chain between the ester function and the piperazine nitrogen.

These compounds also form salts with penicillin and thus may be used to isolate penicillin from fermentation broths and other solutions of this antibiotic.

The compounds of this invention can be conveniently produced by several processes, one of which comprises reacting a lower alkyl disubstituted glycolate with a 4-substituted piperazino-alkanol to produce the desired 4-substituted piperazinoalkyl-disubstituted glycolate. This process may be represented as follows:

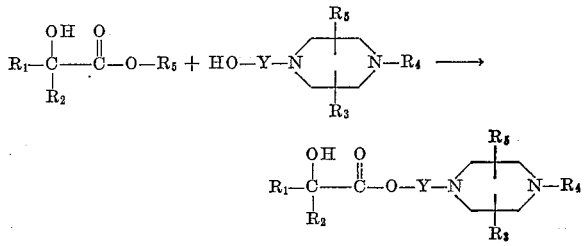

wherein $R_1$, $R_2$, $R_3$, $R_4$, $R_5$ and Y have the significance previously assigned and $R_5$ is a lower alkyl group.

Some of the disubstituted glycolic acids used in the process in the form of lower alkyl esters are methyl benzilate, methyl phenylcyclohexyl glycolate, ethyl phenylcyclopentyl glycolate, methyl 2-thienyl phenyl glycolate, ethyl phenyl propyl glycolate, methyl dicyclohexyl glycolate, ethyl p-chlorophenyl furyl glycolate and methyl p-methoxyphenyl-3-pyridyl glycolate.

Some of the 4-substituted piperazinoalkanols which may be used in this process are 4-allylpiperazino-2-propanol, 4 - cinnamylpiperazinoethanol, 4 - phenylisopropylpiperazino-3-butanol, 4-benzylpiperazino-2-butanol, 4-p-methoxyhenylethylpiperazino-4-pentanol, 4-phenylpropylpiperazino-2-propanol, and 2-methyl-4-cinnamylpiperazino-3-butanol.

Reaction between the lower alkyl disubstituted glycolate and the 4-substituted piperazinoalkanol is conveniently effected by bringing the reactants together in a suitable inert solvent in the presence of sodium or a sodium alkoxide. Solvents such as n-heptane, toluene, xylene or an excess of the piperazino alkanol may be used for the reaction medium. The mixture is generally heated to promote the reaction with the reflux temperature being preferred. As the reaction proceeds, the lower alcohol which is formed in the reaction is distilled off. The reaction is considered completed when low boiling alcohol ceases to distill off. The product is recovered by acidifying the reaction mixture, evaporating to dryness, taking the residue up in water, adding a base such as caustic soda to the aqueous solution and extracting with an immiscible solvent. The extract may then be dried and the product recovered by distillation.

Representative of the products which are produced in this way are 4-phenylisopropylpiperazino-2-propylbenzilate, 4-benzyl piperazinoethyl benzilate, 4-allylpiperazino-3-butyl benzilate, 4-cinnamylpiperazino-2-propyl phenylcyclohexyl glycolate, 4-phenylethylpiperazino-2-propyl phenylcyclophenyl glycolate, 4-phenylpropylpiperazinoethyl phenyl 2-thienyl glycolate, 4-allylpiperazinopropyl phenyl 3-chlorophenyl glycolate, 4-benzylpiperazino-2-propyl furyl propyl glycolate, 4-phenylpropyl piperazino-2-propyl furyl 2-thienyl glycolate, and 2-methyl-4-allylpiperazino 2-propyl benzilate.

An alternate method of producing these novel 4-substituted piperazino compounds wherein the glycolate substituents are both aryl comprises reacting a di-aryl substituted halo or acyloxy acetyl halide with a 4-substituted piperazinoalkanol to produce an intermediate 4-substituted piperazinoalkyl di-aryl substituted halo or acyloxy acetate which is subsequently hydrolyzed to the corresponding 4-substituted piperazinoalkyl di-aryl substituted glycolate.

This process may be represented as follows:

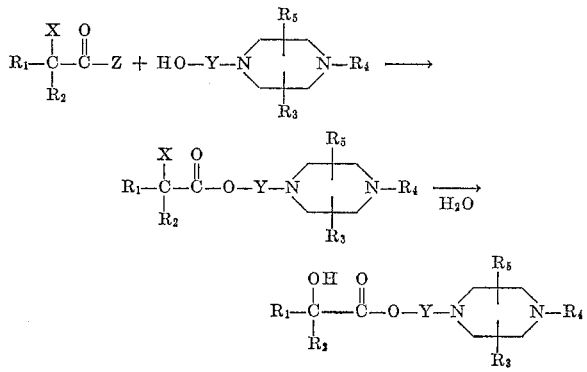

wherein $R_1$ and $R_2$ are the same or different phenyl, substituted phenyl, thienyl or pyridyl groups, $R_3$, $R_4$, $R_5$ and Y have the significance previously assigned, Z is a reactive halogen and advisably chlorine, and X is a reactive halogen such as chlorine or a reactive acyloxy group such as acetoxy.

Representative di-aryl substituted halo or acyloxy acetates which may be used in the process are diphenylchloroacetyl chloride, phenyl 2-thienyl chloroacetyl chloride, diphenyl acetoxy acetyl chloride and 3-pyridyl p-chlorophenyl chloroacetyl chloride.

4-substituted piperazinoalkanols such as those previously named may be used in the process.

In the first step of this process the reactants may be conveniently brought together in an inert organic solvent such as benzene, toluene, isopropanol, or acetone. An acid acceptor such as triethylamine is generally included in the reaction mixture. Elevated temperatures up to the reflux temperature are generally employed to enhance the rate of reaction and maintain solubility of the reactants. The reaction product may be recovered from the mixture by conventional methods.

Some of the compounds which are produced in this way are 4-benzylpiperazino-2-propyl diphenylchloroacetate, 4-phenylisopropylpiperazino-3-butyl phenyl 2-thienyl chloroacetate, 4-phenylethylpiperazino-2-propyl phenyl 3-pyridyl chloroacetate, and 2-methyl-4-phenylpropylpiperazino-2-propyl diphenylchloroacetate.

These and other compounds within the scope of this invention are readily hydrolyzed to the corresponding 4-substituted piperazinoalkyl di-aryl substituted glycolate, advisably in the presence of a mineral acid and preferably hydrochloric acid.

The compounds of this invention can also be conveniently produced by reacting a disubstituted glycolic acid with an appropriate 4-substituted piperazinoalkyl halide. This reaction can be represented as follows:

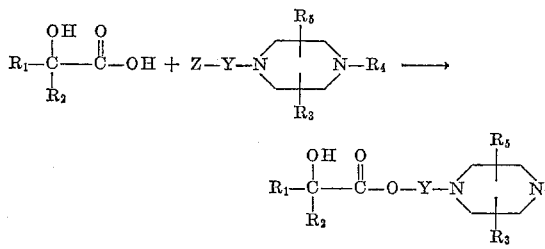

wherein $R_1$, $R_2$, $R_3$, $R_4$, $R_5$, Y and Z have the significance previously assigned.

The reactants used in this process are essentially the same as those named previously except that the free glycolic acid is used plus a 4-substituted piperazinoalkyl halide instead of the corresponding alkanol. The reaction is readily effected by combining the reactants in an inert solvent such as isopropanol and heating the mixture at an elevated temperature, such as the reflux temperature.

Acid addition salts are produced by contacting the compounds with a suitable acid such as formic acid, citric acid, maleic acid, sulfuric acid, hydrochloric acid, succinic acid, tartaric acid, benzoic acid or fumaric acid.

Quaternary ammonium salts are formed by contacting the compounds with a suitable alkylating agent such as dimethyl sulfate or an alkyl halide such as methyl chloride or ethyl bromide.

The active agents of this invention may be administered to animals and humans as pure compounds. It is advisable, however, to first combine one or more of the novel compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar, talc and the like may be used to form powders. The powders may be used as such for direct administration to a patient or, instead, the powders may be added to suitable foods and liquids, including water, to facilitate administration.

The powders may also be used to make tablets, or to fill gelatin capsules. Suitable lubricants like magnesium stearate, binders such as gelatin, and disintegrating agents like sodium carbonate in combination with citric acid may be used to form the tablets.

Unit dosage forms such as tablets and capsules may contain any suitable predetermined amount of one or more of the active agents as a nontoxic acid addition salt and may be administered one or more at a time at regular intervals. Such unit dosage forms, however, should generally contain a concentration of 0.1% to 10% by weight of one or more of the active piperazines. Unit dosage forms should advisably contain about 5 to 50 mg. of the active agents described herein. In general, from about 5 to 150 mg. daily is adequate to achieve marked psychotherapeutic and antispasmodic activity in humans although a daily dose of 15 to 50 mg. is often adequate.

A typical tablet may have the composition:

|     |     | Mg. |
| --- | --- | --- |
| (1) | 4-benzylpiperazinoethyl benzilate dihydrochloride | 10 |
| (2) | Starch U.S.P. | 57 |
| (3) | Lactose U.S.P. | 73 |
| (4) | Talc U.S.P. | 9 |
| (5) | Stearic acid | 6 |

Powders 1, 2 and 3 are slugged, then granulated, mixed with 4 and 5, and tableted.

Capsules may be prepared by filling No. 3 hard gelatin capsules with the following ingredients, thoroughly mixed:

|     |     | Mg. |
| --- | --- | --- |
| (1) | 4-phenylisopropylpiperazinoethyl benzilate dihydrochloride | 5 |
| (2) | Lactose U.S.P. | 200 |
| (3) | Starch U.S.P. | 16 |
| (4) | Talc U.S.P. | 8 |

The oral route is preferred for administering the active agents of this invention.

The following examples are presented to illustrate specific embodiments of the invention.

EXAMPLE 1

*Beta-(4-Benzylpiperazino)-Ethyl Benzilate Dihydrochloride*

This compound was prepared by reacting 29.1 g. (0.13 mole) of 4-benzylpiperazinoethanol with 24.2 g. (0.10 mole) of methyl benzilate in 500 cc. of n-heptane containing 0.8 g. of sodium methoxide at reflux with stirring. The methanol formed during the reaction was separated. The sodium methoxide was removed by filtration and the filtrate washed twice with water. The solvent was removed by distillation and there was obtained 18.4 g. (37%) of the dihydrochloride upon acidification of the basic ester in ether, M.P. 224–225° C. dec.

*Anal.*—Calcd. for $C_{27}H_{32}Cl_2N_2O_3$: Cl, 14.08; N, 5.56. Found: Cl, 14.16; N, 5.46.

EXAMPLE 2

*4-Cinnamyl Piperazinoethanol*

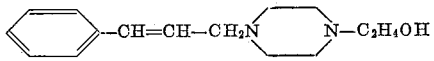

To a mixture of 39.06 g. (0.30 mole) of hydroxyethyl piperazine, 41.46 g. (0.30 mole) of freshly ground anhydrous potassium carbonate and 300 cc. of ethanol, there was added dropwise with stirring 45.8 g. (0.30 mole) of cinnamyl chloride. The mixture was refluxed with stirring for 3 hours, the inorganic salts separated by filtration and the product collected at 165° C. (0.08 mm.); yield 52.5 g. (71%).

*Anal.*—Calcd. for $C_{15}H_{22}N_2O$: N, 11.37. Found: N, 11.26.

EXAMPLE 3

*4-Cinnamylpiperazinoethyl Benzilate Dihydrochloride*

This ester was prepared by the method described in Example 1. From 28.64 g. (0.22 mole) of 4-cinnamylpiperazinoethanol and 48.4 g. (0.20 mole) of methyl benzilate, there was obtained 49.8 g. (47%) of the compound; M.P. 201–202° C. Several recrystallizations from isopropyl alcohol raised the M.P. to 215° C. dec.

*Anal.*—Calcd. for $C_{29}H_{34}Cl_2N_2O_3$: Cl, 13.41; N, 5.29. Found: Cl, 13.42; N, 5.21.

EXAMPLE 4

*4-Allylpiperazinoethyl Phenyl 2-Thienyl Glycolate*

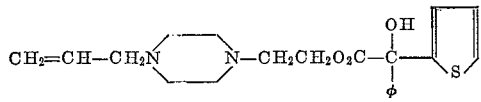

A mixture of 21.4 g. (0.10 mole) of 4-allylpiperazinoethyl chloride, 23.4 g. (0.10 mole) of phenyl 2-thienyl glycolic acid and 300 cc. of anhydrous isopropyl alcohol was refluxed for thirty hours. The isopropyl alcohol was removed by distillation in vacuo. The oily residue was dissolved in water and the aqueous solution extracted with ether. The aqueous layer was neutralized with potassium carbonate and extracted repeatedly with ether. The ether extracts were dried with potassium carbonate and concentrated. The basic ester was a high-boiling water-insoluble oil.

EXAMPLE 5

*Beta-[4-(1-Phenyl-2-Propyl)-Piperazino]-Ethyl Benzilate Dihydrochloride*

A mixture containing 11.7 g. (0.047 mole) of beta-[4-(1-phenyl-2-propyl)-piperazino]-ethanol, 10.4 g. (0.047 mole) of methyl benzilate, 250 cc. of n-heptane, 2 cc. of methanol and 0.3 g. of sodium methoxide was stirred at reflux until the distillation of methanol ceased. The warm mixture was clarified by filtration, the filtrate diluted with chloroform and washed twice with 50 cc. of water. The organic phase was dried with potassium carbonate and the solvent removed by distillation leaving 19.5 g. (90.6%) of crude basic ester. The latter was dissolved in 200 cc. of methanol and converted to the dihydrochloride salt by addition of ethereal hydrochloric acid, yield 11.1 g. (49%); M.P. 238–239° C.

*Anal.*—Calcd. for $C_{29}H_{36}Cl_2N_2O_3$: Cl, 13.34; N, 5.27. Found: Cl, 13.37; N, 5.23.

EXAMPLE 6

*Gamma-(4-Benzyl-3-Methylpiperazino)-Propylbenzilate Dihydrochloride*

A mixture containing 24.2 g. (0.10 mole) of methyl benzilate, 24.8 g. (0.10 mole) of 4-benzyl-2-methylpiperazinopropanol, 0.5 g. of sodium methoxide, and 250 cc. of n-heptane was refluxed for 4 hours while 6 cc. of methanol was collected by distillation. The catalyst was removed by filtration, the filtrate washed with water, dried over potassium carbonate, and concentrated to dryness in vacuo yielding 45.3 g. (99%) of the crude basic ester. The latter was converted to the dihydrochloride salt in acetonitrile, yield 35.4 g. (67%); M.P. 207–208° C.

*Anal.*—Calcd. for $C_{29}H_{36}Cl_2N_2O_3$: Cl, 13.34; N, 5.27. Found: Cl, 13.35; N, 5.35.

EXAMPLE 7

*N-(1-Phenyl-2-Propyl)-N'-Piperazino-Gamma-Propyl Phenylcyclopentyl Glycolate·2HCl*

A mixture of 13.1 g. (0.05 mole) of N-(1-phenyl-2-propyl)-N'-(gamma-hydroxypropyl) piperazine, 11.7 g. (0.05 mole) of methyl phenylcyclopentyl glycolate, 150 ml. of n-heptane and a total of 0.2 g. of fresh sodium methoxide stirred and refluxed until separation of methanol in a solvent separator ceased. (2.2 ml.—Theory 3 ml.). The mixture was filtered warm, washed with chloroform, and the organic filtrates washed with 2×50 ml. of water and dried briefly over anhydrous $K_2CO_3$. The mixture was filtered and the solvents removed in vacuum, 23.2 g. (100%). All the crude ester was dissolved in 200 ml. of anhydrous ether and acidified with ethereal HCl. A precipitate formed at once. It was filtered, washed with ether and oven dried, M.P. 235–238° C. (dec.), 22.0 g. (81.5%).

The product was recrystallized from 270 ml. of acetonitrile. The base was released and reprecipitated as HCl salt. Filtrates from this second recrystallization were allowed to stand several weeks. The second crop was collected, oven dried, M.P. 228–230° C. (dec.) 2.4 g.

*Anal.*—Calcd. for $C_{29}H_{42}Cl_2N_2O_3$: N, 5.20; Cl⁻ 13.16. Found: N, 5.25; Cl⁻ 13.27.

Various changes and modifications of the invention can be made and, to the extent that such variations incorporate the spirit of this invention, they are intended to be included within the scope of the appended claims.

What is claimed is:

1. A member of the group consisting of compounds of the formula

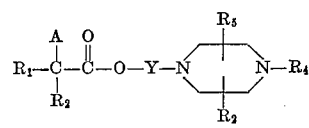

and nontoxic acid addition salts and nontoxic lower alkyl halide quaternary ammonium salts thereof, wherein $R_1$ and $R_2$ are members of the group consisting of phenyl, halophenyl, aminophenyl, lower alkoxyphenyl, thienyl, furyl, pyridyl, and cycloalkyl groups having 3 to 7 carbons in the ring, $R_3$ and $R_5$ are members of the group consisting of hydrogen and lower alkyl groups, $R_4$ is a member of the group consisting of phenyl-lower alkyl, phenyl-lower alkenyl and lower alkenyl, Y is an alkylene group of not more than 5 carbons, and A is a member of the group consisting of hydroxy, halo and the group

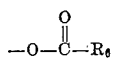

wherein $R_6$ is a lower alkyl.

2. 4-phenyl lower alkyl piperazino-lower alkyl benzilate.

3. Beta-(4-benzylpiperazino)ethyl benzilate.

4. Beta-(4-cinnamylpiperazino)ethyl benzilate.

5. Beta-(4-allylpiperazino)ethyl phenyl 2-thienyl glycolate.

6. Beta-[4-(1-phenyl-2-propyl)-piperazino]-ethyl benzilate.

7. Gamma-(4-benzyl-3-methylpiperazino) - propylbenzilate.

8. A compound of the formula

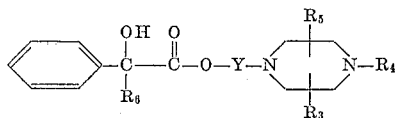

in which $R_6$ is a cycloalkyl having 3 to 7 carbons in the ring, Y is a lower alkylene of not more than 5 carbons, $R_4$ is phenyl-lower alkyl, and $R_3$ and $R_5$ are members of the group consisting of hydrogen and lower alkyl groups.

9. N-(1-phenyl-2-propyl)-N'-piperazino-gamma-propyl phenylcyclopentyl glycolate.

References Cited in the file of this patent

UNITED STATES PATENTS

| | | |
|---|---|---|
| 2,419,366 | Northey et al. | Apr. 22, 1947 |
| 2,514,181 | Smith | July 4, 1950 |
| 2,953,565 | Faust et al. | Sept. 20, 1960 |
| 3,038,901 | Hayao | June 12, 1962 |

FOREIGN PATENTS

| | | |
|---|---|---|
| 625,811 | Great Britain | July 5, 1949 |

UNITED STATES PATENT OFFICE
CERTIFICATE OF CORRECTION

Patent No. 3,125,577            March 17, 1964

John H. Biel

It is hereby certified that error appears in the above numbered patent requiring correction and that the said Letters Patent should read as corrected below.

Column 1, line 17, for "may" read -- May --; column 2, lines 35 and 36, for "4-p-methoxyhenylethylpiperazino-4-pentanol" read -- 4-p-methoxyphenylethylpiperazino-4-pentanol --; line 61, for "phenylcyclophenyl" read -- phenylcyclopentyl --; column 6, lines 45 to 50, for that portion of the formula read

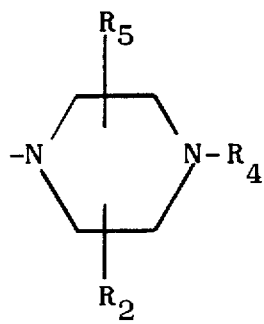 read 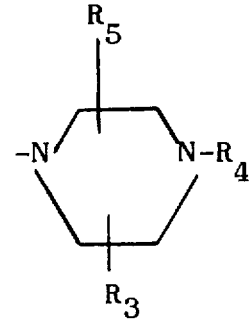

Signed and sealed this 14th day of July 1964.

(SEAL)
Attest:

ESTON G. JOHNSON            EDWARD J. BRENNER

Attesting Officer            Co    ssioner of Patents